United States Patent
Panchapakesan et al.

(10) Patent No.: US 11,182,503 B2
(45) Date of Patent: Nov. 23, 2021

(54) DYNAMIC CONTENT REDACTION

(71) Applicant: AirWatch LLC, Atlanta, GA (US)

(72) Inventors: Ramani Panchapakesan, Bangalore (IN); Vijaykumar Bhat, Bangalore (IN); Gangadhar Nittala, Bangalore (IN)

(*) Notice: Subject to any disclaimer, the term of this patent is extended or adjusted under 35 U.S.C. 154(b) by 110 days.

(21) Appl. No.: 16/113,162

(22) Filed: Aug. 27, 2018

(65) Prior Publication Data
US 2019/0005265 A1 Jan. 3, 2019

Related U.S. Application Data

(63) Continuation of application No. 14/873,524, filed on Oct. 2, 2015, now Pat. No. 10,083,320.

(30) Foreign Application Priority Data

Jun. 24, 2015 (IN) .......................... 3175/CHE/2015

(51) Int. Cl.
*G06F 21/62* (2013.01)
*H04L 12/58* (2006.01)
*G06F 40/117* (2020.01)

(52) U.S. Cl.
CPC ...... *G06F 21/6254* (2013.01); *G06F 21/6245* (2013.01); *G06F 40/117* (2020.01); *G06F 2221/2141* (2013.01); *H04L 51/12* (2013.01)

(58) Field of Classification Search
None
See application file for complete search history.

(56) References Cited

U.S. PATENT DOCUMENTS

| 5,581,682 | A | 12/1996 | Anderson et al. |
| 5,903,646 | A * | 5/1999 | Rackman ............ G06F 21/6218 380/54 |
| 7,272,610 | B2 | 9/2007 | Torres |
| 8,533,078 | B2 | 9/2013 | Schrichte |
| 8,590,034 | B2 * | 11/2013 | Hussain ............... G06F 21/6227 726/13 |
| 9,298,741 | B1 * | 3/2016 | Strand .................... G06T 3/4092 |
| 9,378,379 | B1 | 6/2016 | Treadwell |
| 9,684,798 | B2 * | 6/2017 | Bhogal ..................... G06F 16/93 |
| 10,375,116 | B2 * | 8/2019 | Cheng ...................... H04L 63/08 |
| 10,395,059 | B2 * | 8/2019 | Scaiano .................. G06N 7/005 |
| 10,977,614 | B2 * | 4/2021 | Schrichte ............... G06Q 10/10 |

(Continued)

*Primary Examiner* — Michael W Chao
(74) *Attorney, Agent, or Firm* — Thomas | Horstemeyer, LLP.; Jason M. Perilla

(57) ABSTRACT

Dynamic content redaction though the generation of redaction schemas associated with document, image, media, or other data files is described. A redaction schema can include at least one range of content in a data file to be concealed for a user, a group of users, or operating parameters of various devices, for example. When the data file is opened for display on a device, the redaction schema can be parsed to identify whether masking objects should be added to a masking layer for overlay upon or above the content displayed. The masking layer can be generated based on the redaction schema, a user of the device, or operating parameters of the device, for example. Masking objects in the masking layer can conceal one or more ranges of the content in a data file from view or based on users or operating parameters of various devices.

20 Claims, 7 Drawing Sheets

(56) References Cited

U.S. PATENT DOCUMENTS

| | | | |
|---|---|---|---|
| 11,055,445 B2* | 7/2021 | Weksler | G06F 21/84 |
| 2004/0088313 A1 | 5/2004 | Torres | |
| 2005/0132070 A1* | 6/2005 | Redlich | G06F 21/6209 709/228 |
| 2006/0218149 A1* | 9/2006 | Patrick | G06F 21/6218 |
| 2007/0030528 A1* | 2/2007 | Quaeler | G06F 16/33 358/453 |
| 2008/0239365 A1* | 10/2008 | Salgado | G06F 3/1284 358/1.15 |
| 2009/0019379 A1* | 1/2009 | Pendergast | G06F 16/93 715/762 |
| 2009/0025063 A1 | 1/2009 | Thomas | |
| 2009/0048997 A1* | 2/2009 | Manickam | H04L 63/0407 706/47 |
| 2009/0049511 A1* | 2/2009 | Manickam | G06F 21/6254 726/1 |
| 2009/0070881 A1 | 3/2009 | Yellepeddy et al. | |
| 2009/0089663 A1 | 4/2009 | Rebstock et al. | |
| 2009/0164878 A1* | 6/2009 | Cottrille | G06F 21/6245 715/210 |
| 2009/0178144 A1* | 7/2009 | Redlich | G06F 21/6209 726/27 |
| 2009/0323087 A1* | 12/2009 | Luo | G06F 40/197 358/1.9 |
| 2011/0055932 A1 | 3/2011 | Fox et al. | |
| 2011/0099602 A1* | 4/2011 | Apparao | H04L 63/20 726/1 |
| 2011/0107204 A1* | 5/2011 | Cohen | G09C 5/00 715/243 |
| 2011/0119361 A1* | 5/2011 | Issa | G06Q 30/02 709/223 |
| 2011/0209053 A1* | 8/2011 | Stronger | G06F 21/6227 715/255 |
| 2011/0239113 A1 | 9/2011 | Hung et al. | |
| 2012/0096557 A1 | 4/2012 | Britton et al. | |
| 2012/0216290 A1 | 8/2012 | Roy et al. | |
| 2012/0240238 A1* | 9/2012 | Gates | H04N 21/4334 726/26 |
| 2013/0208966 A1* | 8/2013 | Zhao | G06F 9/5072 382/131 |
| 2013/0272523 A1* | 10/2013 | McCorkindale | H04N 1/44 380/243 |
| 2014/0047234 A1* | 2/2014 | Davis | G06F 21/6209 713/160 |
| 2014/0047560 A1* | 2/2014 | Meyer | G06F 21/10 726/28 |
| 2014/0123303 A1* | 5/2014 | Shukla | G06F 21/6254 726/26 |
| 2014/0304825 A1* | 10/2014 | Gianniotis | G06F 21/6254 726/26 |
| 2014/0317049 A1* | 10/2014 | DeRoller | G06Q 10/103 707/608 |
| 2015/0101022 A1* | 4/2015 | Zent | H04L 63/104 726/4 |
| 2015/0161406 A1* | 6/2015 | Fox | G06F 21/62 726/27 |
| 2015/0169886 A1* | 6/2015 | Bhagwan | G06F 21/6254 726/26 |
| 2016/0078247 A1* | 3/2016 | Tucker | G06F 21/10 726/1 |
| 2016/0127322 A1* | 5/2016 | Ben-Natan | G06F 21/6263 726/26 |
| 2016/0321469 A1 | 11/2016 | Bhogal et al. | |
| 2016/0335415 A1* | 11/2016 | Jones | G06F 21/10 |
| 2017/0085534 A1* | 3/2017 | Iyer | G06F 16/258 |
| 2017/0132186 A1 | 5/2017 | Plummer | |
| 2017/0147828 A1 | 5/2017 | Kurian et al. | |
| 2017/0177906 A1 | 6/2017 | Bhogal et al. | |
| 2017/0220813 A1* | 8/2017 | Mullins | G06F 21/6218 |
| 2017/0220818 A1* | 8/2017 | Nagasundaram | H04L 63/107 |
| 2019/0258621 A1* | 8/2019 | Mohen | G06F 16/2291 |
| 2019/0268340 A1* | 8/2019 | Decouteau | H04L 63/10 |
| 2019/0318105 A1* | 10/2019 | Roth | G06F 21/602 |

* cited by examiner

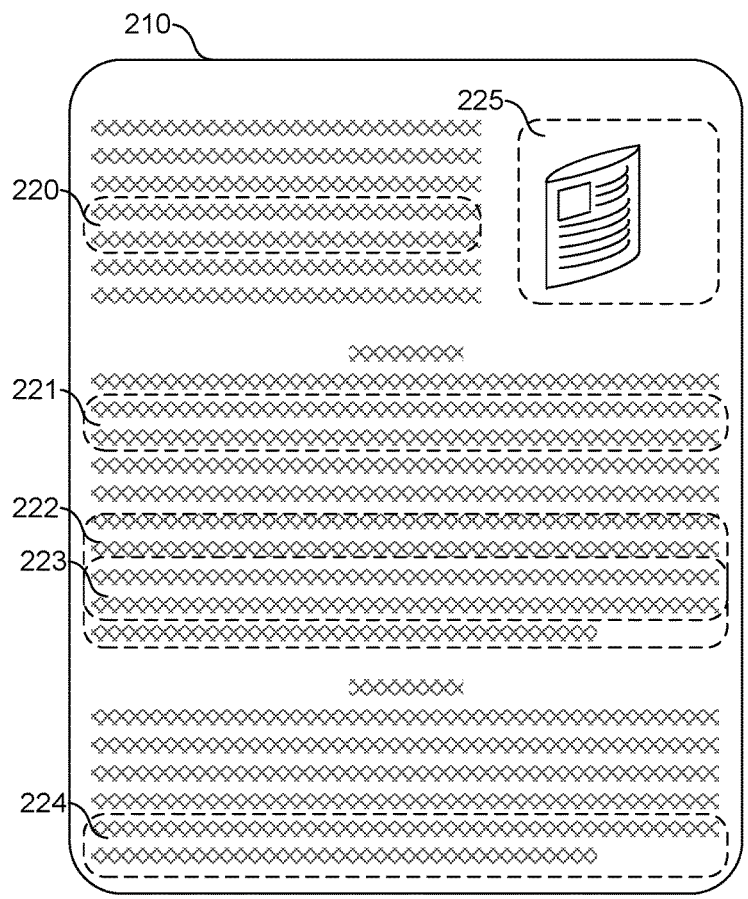
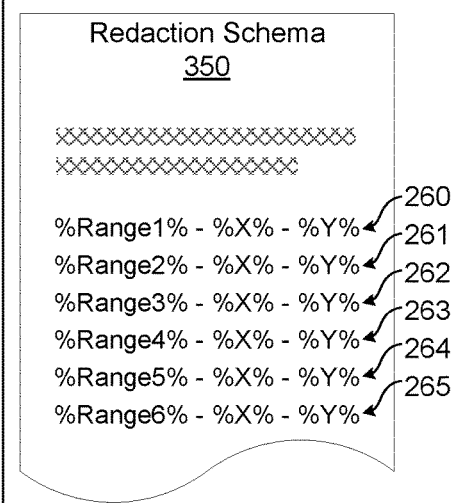
FIG. 4
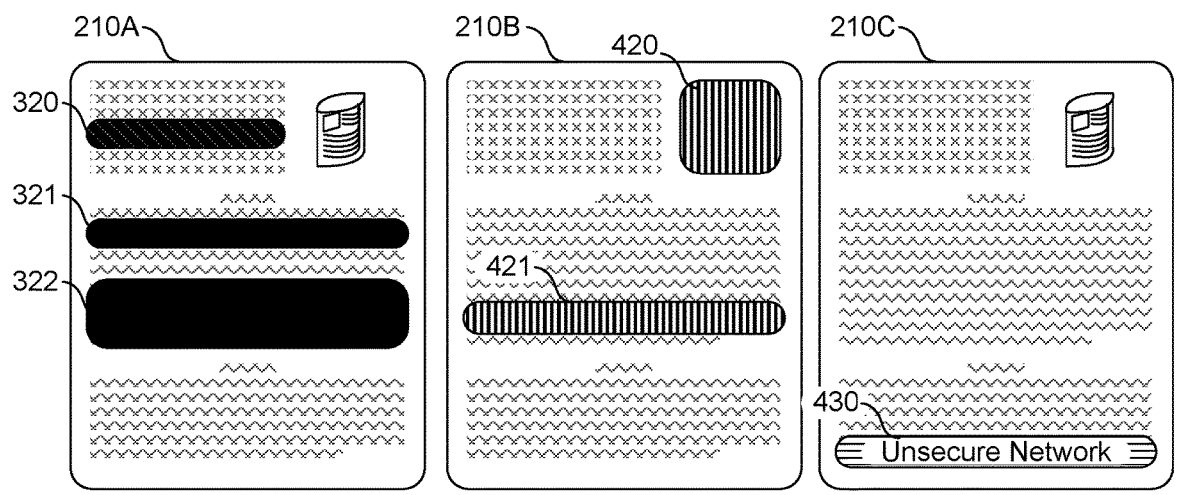
 Joe
 Sarah "Network X"

DYNAMIC CONTENT REDACTION

CROSS-REFERENCE TO RELATED APPLICATIONS

This application is a continuation of U.S. patent application Ser. No. 14/873,524, entitled "DYNAMIC CONTENT REDACTION," filed Oct. 2, 2015, the entire disclosure of which is hereby fully incorporated herein by reference.

BACKGROUND

Before documents and data files were edited and transferred electronically over data networks, the traditional method of redacting sensitive information from paper documents amounted to crossing out portions of text with a wide permanent marker or black tape, for example, followed by photocopying.

Today, electronic document, image, media, and other types of data files can be viewed on display screens of various computing platforms at nearly any geographic location. As with paper documents, however, some data files include sensitive information or content. In some cases, before such data files are distributed over computer networks, it is necessary to redact one or more portions of them. As with paper documents, the redaction of a data file is intended to permit the selective disclosure of certain information in the data file while keeping other parts secret. Thus, one or more sensitive portions of the data file are obscured or removed using any suitable technique.

Once redacted the new copy of the data file including a redacted portion message in, the redacted portions of a data file are static in nature. In other words, regardless of the user or type of computing platform on which such redacted data files are viewed, the redacted portions are always the same. Thus, if a data file is being distributed to multiple individuals, where each individual has a different level of clearance to view certain sensitive or confidential material, it can be necessary to generate different copies of the data file, each being tailored for a certain individual's level of clearance. Even in this case, there may be no way to assure that an individual having a high level of clearance will not inadvertently distribute his copy of the data file to another individual having a lower level of clearance. Generating and separately storing different redacted versions of files can dramatically increase the storage requirements for companies and organizations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 illustrates content of a document, redaction schema data associated with the content, and the display of three dynamically redacted documents according to various examples described herein.

DETAILED DESCRIPTION

Figure 1:
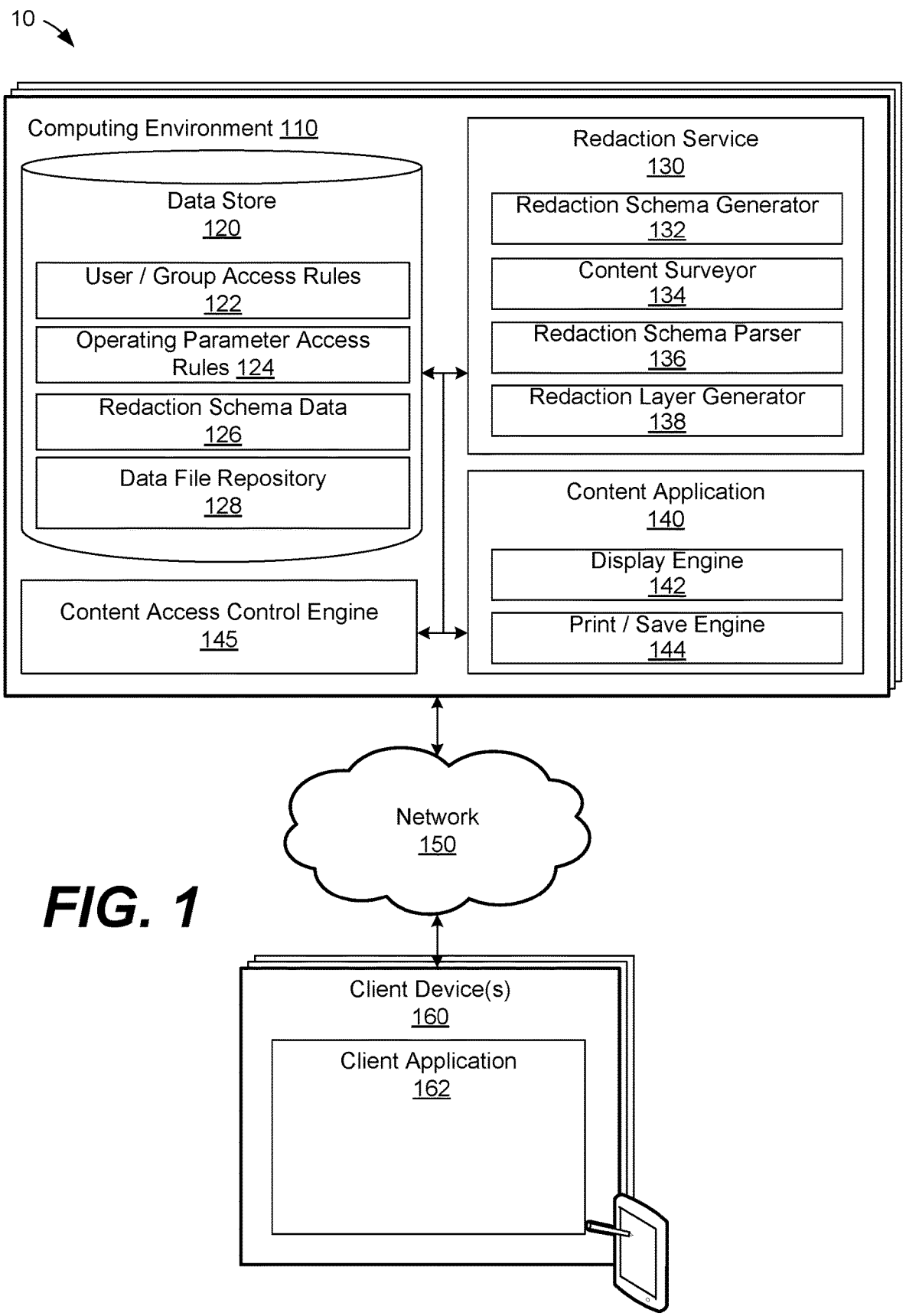
FIG. 1 illustrates an example diagram of a networked computing environment for dynamic content redaction.

As noted above, document, image, media, and other forms of data files can be viewed by different users on various computing platforms at nearly any geographic location. Some data files, however, include sensitive information or content. Thus, for data files that include sensitive or confidential content, it might be necessary or prudent to mark one or more ranges of the content in the data files for redaction when they are saved for access over computer networks.

Conventionally, regardless of the user or type of computing platform on which redacted data files are viewed, the redacted portions are static or always the same. This static nature of content redaction in documents and other data files does not take into account the fact that, over computing networks, the data files can be retrieved and accessed by various users having different levels of authorization or priority to view sensitive or confidential information. Thus, it may be desirable to mark one range of content in a document for redaction for a first group of users and mark a second range of content in a document for redaction for a second group of users. Similarly, it may be desirable to mark one or more ranges of content for redaction depending upon certain operating status parameters of a device which is used to display the content, such as whether the device is communicating over a secure network or within a certain geographic boundary.

In the context outlined above, concepts of dynamic content redaction are described herein. As further described below, dynamic content redaction is achieved though the generation of redaction schemas associated with document, image, media, or other data files. A redaction schema can include at least one range of content in a data file to be concealed for a user, a group of users, or operating parameters of various devices, for example. When the data file is opened for display on a device, the redaction schema can be parsed to identify whether masking objects should be added to a masking layer for overlay upon or above the content displayed. The masking layer can be generated based on the redaction schema, a user of the device, or operating parameters of the device, for example, among other factors. Masking objects in the masking layer can conceal one or more ranges of the content in a data file from view or based on users or operating parameters of various devices.

Redaction schemas can be used by both client devices and servers. For example, after a redaction schema is generated for a document, the redaction schema can be referenced by a client device to generate a masking layer for overlay over content being displayed. Additionally, when a server receives a request for a document from a client, the server can reference the redaction schema, generate a masking layer based in part on the redaction schema, and apply the masking layer to the document to generate a redacted document for communication to the client. In either case, a server can store a copy of a data file and, by applying redactions prior to transmission to a client or having the client redact the file itself, an unlimited number of different redacted versions of the file can be generated based on user permissions and other criteria described herein.

Turning to the drawings, the following paragraphs provide a general description of a representative system and its components followed by a discussion of the operation of the same.

FIG. 1 illustrates an example diagram of a networked computing environment 10 for dynamic content redaction. The networked environment 10 includes a computing environment 110, a network 150, and a client device 160. The computing environment 110 can be a computer, computing device, or computing system. In certain embodiments, the computing environment 110 can include one or more computing devices arranged, for example, in one or more server or computer banks. The computing device or devices can be located at a single installation site or distributed among different geographical locations. The computing environment 110 can include a plurality of computing devices that together embody a hosted computing resource, a grid computing resource, or other distributed computing arrangement. In some cases, the computing environment 110 can be an elastic computing resource where an allotted capacity of processing, network, storage, or other computing-related resources varies over time. The computing environment 110 can also include or correspond to one or more virtualized server instances that are created in order to execute the functionality described herein.

The computing environment 110 can also include, in part, various functional (e.g., computer-readable instruction), logic (e.g., device, circuit, or processing circuit), or functional and logic elements that can be executed by the computing environment 110 to direct the computing environment 110 to perform aspects of the examples described herein. Generally, according to the examples of dynamic content redaction described herein, the computing environment 110 can store data files, generate and store redaction schemas associated with the data files, provide authenticated or controlled access to the data files, and in connection with the client device 160, render the data files for display on the client device 160 along with a dynamic masking layer that obscures one or more ranges of content in the data files. To those ends, the computing environment 110 includes a data store 120, a redaction service 130, a content application 140, and a content access control engine 145, each of which is further described below.

The network 150 can include the Internet, intranets, extranets, wide area networks (WANs), local area networks (LANs), wired networks, wireless networks, cable networks, satellite networks, other suitable networks, or any combinations thereof. The computing environment 110 can communicate with other devices coupled to the network 150 using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof. The network 150 can include connections to any number and type of network hosts or devices, such as website servers, file servers, cloud computing resources, databases, data stores, or any other network or computing architectures.

The client device 160 is representative of one or a plurality of client devices of one or more users. The client device 160 can be any computing device, processing circuit, or processor based device or system, including those in the form of a desktop computer, a laptop computer, a personal digital assistant, a wearable computing device, a cellular telephone, a set-top box, a music or media player, or a tablet computer, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

As illustrated in FIG. 1, the client device 160 can execute various applications, such as the client application 162, which is representative of one application that can be executed on the client device 160. In one embodiment, the client application 162 can be a standalone data file content viewer application that executes on the client device 160 to access data files stored on the computing environment 110 through the network 150. To this end, the client application 162 can be a document viewer or editor application, image viewer or editor application, media file viewer, or editor application. The client application 162 can also be a hypertext-based communications application, such as Wget or cURL, or an internet browser, such as the Internet Explorer®, Firefox®, Chrome®, Safari®, or Silk® browsers, another type of browser or tool, or a variant thereof, without limitation.

Alternatively, the client application 162 can be a dedicated application or console, such as the Microsoft Outlook® e-mail client, that interacts with the computing environment 110 using a suitable protocol through the network 150. As another alternative, the client application 162 can be a messenger client or application, such as Microsoft Lync®, Short Messaging Service (SMS), or Multimedia Messaging Service (MMS). Generally, when executed in the client device 160, the client application 162 can interpret and render a webpage, display console, or similar user interface on a display of the client device 160. In the context of rendering and displaying content from data files, as further described below, any of the examples of the client application 162 (or variants thereof) can render and display the content on a display of the client device 160.

Next, a more detailed description of the operation of the computing environment 110 is provided. Among other elements, the computing environment 110 includes a data store 120, a redaction service 130, a content application 140, and a content access control engine 145. Among other types, categories, or partitions of data, the data store 120 can store user and group access rules 122, operating parameter access rules 124, redaction schema data 126, and a data file repository 128. The redaction service 130 includes one or more logic elements, engines, or services that perform or embody various aspects of the features described herein, including a redaction schema generator 132, a content surveyor 134, a redaction schema parser 136, and a redaction layer generator 138. Additionally, the content application 140 includes one or more logic elements, engines, or services that perform or embody various aspects of the features described herein, including a display engine 142 and a print/save engine 144.

In the data store 120, the user and group access rules 122 include various access rules associated with individual users, groups of users, or both individual users and groups of users. It is noted that the content access control engine 145 can permit or deny access to one or more data files stored in the data file repository 128 depending upon who is seeking to access the data files. Thus, the computing environment 110 permits or denies access to data files stored in the data file repository 128, for example, based on the authentication and identification of users. In that context, when a user of the client device 160, for example, seeks access to one or more data files stored in the data file repository 128, the content access control engine 145 first identifies and authenticates the user using facial recognition, a login name and password, a pin number, a hardware or software key or certificate, or another authentication mechanism. Once the user of the client device 160 is identified, the content access control engine 145 can reference the rules stored in the user and group access rules 122 to determine whether the user of the client device 160 is authorized to access the one or more data files requested by the user. In that context, the client application 162 and the content application 140, each of which can operate according to certain access rules, can permit or deny access to data files stored in the data file repository 128 depending upon who is seeking to access the data files, among other access rules. In addition to enforcing these access compliance rules, the client application 162 can also enforce other restriction rules, such as disabling the ability to cut, copy, or paste content being viewed with other applications executing on the client device 160. Similarly, based in part on the operation of the client application 162 and the operating system software executing on the client device 160, the data processed by the client application 162 can be inaccessible to other applications executing on the client device 160.

The operating parameter access rules 124 include various access rules associated with the operating parameters or operating conditions of computing devices, such as the client device 160, for example. The content access control engine 145 can permit or deny access to one or more data files stored in the data file repository 128 depending upon the operating status of the client device 160. In that sense, the computing environment 110 incorporates additional aspects of selective, secure access in which access to data files stored in the data file repository 128 is permitted or denied, for example, based on the operating parameters of computing devices that seek access.

When a user of the client device 160, for example, seeks access to one or more data files stored in the data file repository 128, the content access control engine 145 can compare one or more operating status parameters of the client device 160 against one or more access control rules stored in the operating parameter access rules 124. By doing so, the content access control engine 145 can determine if access is permitted. For example, access might be denied if the client device 160 is connected to certain networks or fails to meet certain operating system or hardware requirements. Additionally, the access control rules can define certain time of day, geographic boundary, or other requirements for access.

Among others, the operating status parameters of the client device 160 can include a device identifier of the client device 160, a communications network to which the client device 160 is communicatively coupled, a geographic location of the client device 160, a compliance rule associated with the client device 160, a current version of software being executed, whether or not a service is executing, or some other hardware or software operating condition or identifier. Generally, the operating status parameters of the client device 160 can include any hardware-, software-, or computing environment-related operating conditions or parameters of the client device 160. The operating parameters can be sent by the client device 160 to the computing environment 110 periodically or at one or more predetermined times, for example. Additionally or alternatively, the computing environment 110 can request the operating parameters from the client device 160 periodically or at one or more predetermined times. As noted above, the content access control engine 145 can compare one or more operating status parameters received from the client device 160 against the operating parameter access rules 124 as a security measure to determine if access to the data file repository 128, for example, should be permitted. Further aspects of the operation of the access control engine 145 are described below.

The redaction schema data 126 can include one or more redaction schemas for various data files stored in the data file repository 128. As one example, the redaction schema data 126 includes one redaction schema for each data file stored in the data file repository 128. In other cases, the redaction schema data 126 includes one redaction schema for multiple data files stored in the data file repository 128. Each redaction schema can include redaction information for any number of users or groups of users. For example, one redaction schema can include a set of redaction information for a first user or group of users and include another set of redaction information for a second user or group of users. Additionally or alternatively, the redaction schema data 126 can include a separate redaction schema for each user and each data file. Other organizations of redaction information and data files are within the scope of the examples described herein. It should also be appreciated that it is not necessary that each data file stored in the data file repository 128 be associated with a redaction schema stored in the redaction schema data 126.

The data file repository 128 can store data files, such as text, document, publishing, financial, geographic information system, graphics, presentation, script, spreadsheet, webpage, image, media, backup, archive, database, compressed and uncompressed disk, computer aided design, design automation, and other types of data files, in any suitable file format, without limitation. The data file repository 128 can store the data files and, based on the access control provided by the content access control engine 145, provide access to the data files by users of various computing devices, such as the client device 160, over the network 150.

Turning to the operation of the redaction service 130, it is noted that the redaction service 130 can conduct at least two main services, including the generation of redaction schemas for data files and the application of redaction schemas to data files for dynamic redaction. As for the generation of redaction schemas, the redaction schema generator 132 can generate redaction schemas in association with data files stored in the data file repository 128. Once generated, the redaction schemas are stored in the redaction schema data 126, for later reference. As described in further detail below, to generate a redaction schema, the redaction schema generator 132 can identify at least one range of content to be concealed in a data file. The range of content can be selected or identified through a suitable user interface of the client application 162, for example, when the content of the data file is displayed on the client device 160.

Depending upon the type of the data file, the range of the content can be identified with reference to the type, organization, or data structure of the content in the data file. For example, the range of the content can be identified with reference to at least one line or paragraph number of text in a document file, a pixel range of an image in an image file, or a playback time range of media in an audio or video file.

Once any given range of content is identified, the redaction schema generator 132 can identify at least one user, group of users, device operating parameter, or other rule or factor for which the range of content is to be concealed. The factors can be selected or identified through a suitable user interface of the client application 162, for example, after the range of content is selected on the client device 160. A user can be identified, for example, by name, username, employee identifier, or other identifier, and any group of users can be identified using a suitable identifier for the group, regardless of how the group is organized. As one example, a group of users can consist of a category of individuals assigned to a business or engineering group. As another example, a group of users can consist of executive-level employees (e.g., C-level executives), board members, or another level or category of employees in an organization.

Additionally or alternatively, the redaction schema generator 132 can identify at least one device operating parameter for which a range of the content is to be concealed. The device operating parameters can be identified through a suitable user interface of the client application 162, for example, after the range of content is selected on the client device 160. The device operating parameters can include operating status parameters of client devices and can include any hardware-, software-, or computing environment-related operating conditions or parameters. Among others, the operating status parameters of the client device 160 can include a device identifier of the client device 160, a communications network to which the client device 160 is communicatively coupled, a geographic location of the client device 160, a compliance rule associated with the client device 160, a current version of software being executed, whether or not a service is executing, or some other hardware or software operating condition or identifier.

Once one or more ranges of content in a data file and any associated users, groups, device operating parameters, or other rules or factors are identified, the redaction schema generator 132 can generate a redaction schema for the data file. Such a redaction schema includes the range or ranges of the content to be concealed in association with the users, groups, or device operating parameters for which range or ranges of the content are to be concealed. It should also be appreciated that, rather than identifying one or more ranges of content for which content should be concealed for certain users, the redaction schema generator 132 can identify ranges which should not be concealed (with or without the remaining portions being entirely concealed). Similarly, rather than identifying users or groups for which one or more ranges should be concealed (e.g., a "blacklist"—all others permitted to view), the redaction schema generator 132 can identify users or groups for which one or more ranges should be revealed (e.g., a "whitelist"—no others permitted to view).

After the redaction schemas are generated and stored in the computing environment 110, the redaction service 130 can apply those redaction schemas to achieve the dynamic redaction of content in data files as those files are accessed. This just-in-time type redaction can be based on the user requesting access, the operating parameters of the device requesting access, or other factors. In the application of redaction schemas for dynamic redaction, the content surveyor 134, redaction schema parser 136, and redaction layer generator 138 work together to display content on the client device 160, interpret the redaction schemas, and generate redaction layers for display on the client device 160, for example, to mask certain ranges of the displayed content.

As a more specific example, when a user of the client device 160 accesses data served by the computing environment 110, the client device 160, the user of the client device 160, or both can be identified and authorized (or rejected) by the content access control engine 145. In that regard, the content access control engine 145 can present a challenge, such as a log-in page, password request, secret information exchange, or other challenge, to verify the client device 160, the user of the client device 160, or both. When a data file is accessed by the client device 160 after the authentication, the redaction layer generator 138 can generate a redaction layer including one or more masking objects to overlay above the content displayed on the client device 160, at least to the extent that the redaction schema identifies ranges of content to be obscured for the user. To generate the masking layer, the redaction schema parser 136 can parse a redaction schema associated with the data file being accessed. For example, among other ranges, the redaction schema can include a range of the content to be concealed for the user of the client device 160. In turn, the redaction layer generator 138 can dynamically generate the masking layer according to the information in the redaction schema. It should be appreciated that, depending upon the user of the client device 160, which is identified during the authentication, the redaction layer generator 138 may or may not obscure the range of content for a given data file. Other examples of dynamic redaction according to the concepts described herein are provided below.

The content application 140 comprises a display engine 142 and a print/save engine 144. The content application 140 can be an application or program which can be accessed by the client device 160 but which executes on the computing environment 110. Thus, the client device 160 can rely upon the content application 140 to access, view, or edit data files stored in the data file repository 128, in a way similar to the client application 162. Among other elements, the content application 140 includes a display engine 142 and a print/save engine 144. As described in further detail below, the display engine 142 can display content from data files stored in the data file repository 128, and the print/save engine 144 can print and save copies of the content.

Figure 2:
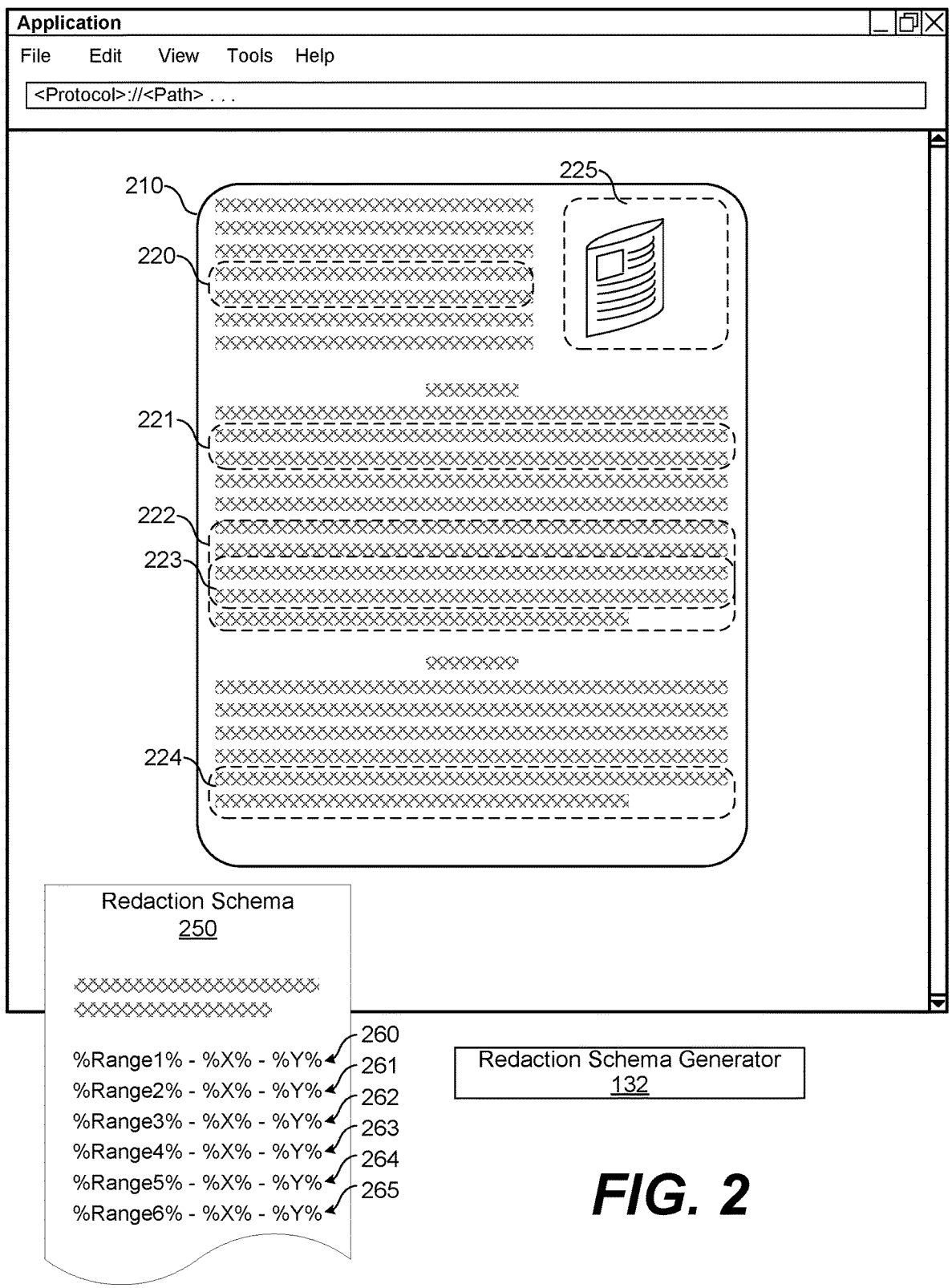
FIG. 2 illustrates an example data file and ranges of content in the data file according to one example described herein.

As one example of the redaction of content in a data file using the redaction service 130, FIG. 2 illustrates content 210 in a data file and user-identified ranges of content 220-225 to be redacted in the data file. FIG. 2 also illustrates an example redaction schema 250 and arguments 260-265 of the redaction schema 250. As one example of a data file that can be stored in the data file repository 128, the content 210 includes text and images of an electronic document. The content 210 can be rendered for display on the client device 160 by the display engine 142 of the content application 140, for example, or directly on the client device 160 by the client application 162.

Among other ranges or portions of the content 210, a user of the client device 160 can identify one or more of the ranges of content 260-265. As described in further detail below, the ranges of content 260-265 can be identified, together or sequentially, using the client device 160 in any suitable manner, such as by selecting content using input devices, pointers, cursors, keyboards, or other input devices, without limitation. Here, it should be appreciated that the manner in which a range of content is identified can vary depending upon the type of content, input devices available at the client device 160, for example, or other related factors.

Depending upon the type of content, a range or portion of content can be identified using a line or paragraph number for an electronic document, using a pixel range for an image, or using a playback time range for an audio file. Further, a range of content for a video can include both a playback time range as well as a range of pixels in one or more frames. Also, in addition to identifying content by range, content can be identified according to other criteria, such as individual words or phrases, characters, numbers, paragraphs or paragraph numbers, time ranges, pixel ranges, frame ranges, or other criteria.

Once a user of the client device 160 identifies the range of content 220, for example, the user can also identify at least one individual, user, or group for which the range of content 220 should be concealed or redacted using a user interface of the client application 162. Similarly, the user of the client device 160 can identify at least one individual, user, or group for which the ranges of content 221-225 should be concealed or redacted. Among other ways, a user can be identified by name, username, employee identifier, or other identifier, and any group of users can be identified using a suitable identifier for the group, regardless of how the group is organized. Similarly, among other ways, device operating parameters can be identified with reference to a device identifier, a communications network, a geographic location, or some other hardware or software operating condition.

After the ranges 220-225 and associated users or groups for redaction are identified, the redaction schema generator 132 can generate the redaction schema 250. In FIG. 2, a redaction schema 250 generated by the redaction schema generator 132 is illustrated along with the arguments 260-265. Each argument 260-265 can include an identifier of one or more ranges or other identifiers of content, along with the associated conditions or factors for which such ranges should be concealed or redacted. The redaction schema 250 can take on any suitable format or syntax, without limitation, so long as the associations between ranges of content and the respective conditions or factors for redaction are maintained. In various cases, the redaction schema 250 can outline both ranges of content which should be concealed for certain conditions, as well as ranges of content which should not be concealed but for certain conditions. Once generated, the redaction schema generator 132 can store the redaction schema 250 in the redaction schema data 126 for reference at a later time.

Figure 3:
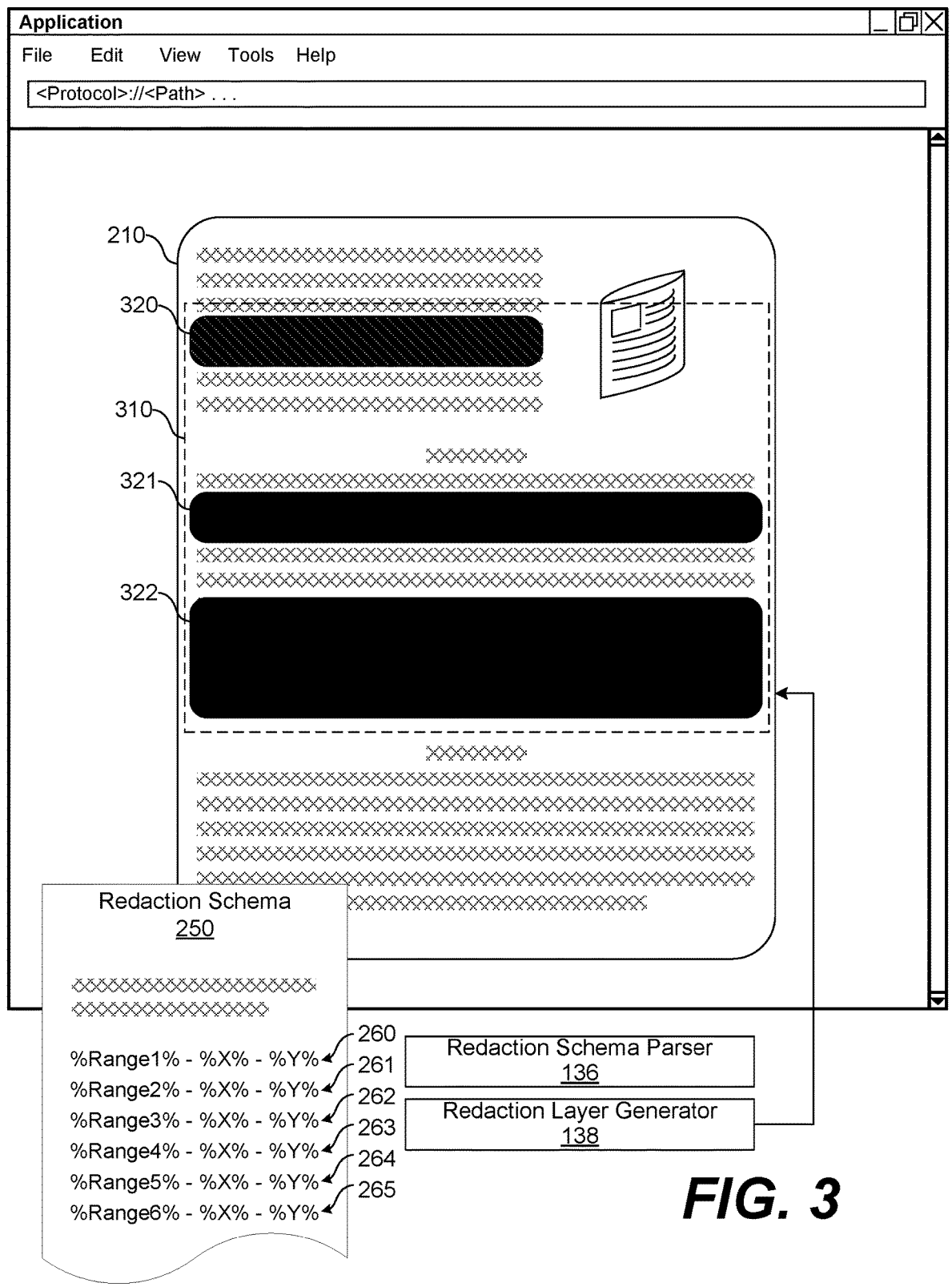
FIG. 3 illustrates a display of a dynamically redacted document according to one example described herein.

As an example of a document that has been dynamically redacted by the redaction service 130, FIG. 3 illustrates a redacted display of the content 210. In FIG. 3, a redaction layer 310 with masking objects 320-322 is shown over the content 210. The redaction layer generator 138 can generate the redaction layer 310 based on the redaction schema 250. The redaction layer generator 138 can also overlay the redaction layer 310 over the content 210 to obscure ranges of the content 210. As shown in FIG. 3, each of the masking objects 320-322 in the redaction layer 310 conceals or obscures at least one range of the content 210 from view.

According to the concepts of dynamic redaction described herein, the number and placement of the masking objects 320-322 in the redaction layer 310 can vary based on the arguments 260-265 in the redaction schema 250, the current user of the device being used to access the content 210, the device being used to access the content 210, the current operating parameters of the device, and other factors. For example, the masking objects 320-322 can be generated by the redaction layer generator 138 for the user "Joe" of the client device 160, when the arguments 260-262 indicate that ranges 220-222 of the content 210 should be masked or redacted when "Joe" views the content 210.

The redaction layer generator 138 can generate and display the redaction layer 310 separately from the content 210 itself. In other words, before or after the display engine 142 (or a similar element in the client application 162) renders the content 210 on a display of a device (e.g., the client device 160), the redaction layer generator 138 can overlay the redaction layer 310 over the content 210. The content 210 or associated data file, however, is not modified. Instead, one or more ranges of the content 210 can be masked or obscured from view without the underlying content 210 being disturbed.

The masking objects 320-322, can be opaque objects of any color (e.g., black, white, or other color) or semitransparent objects. The masking objects 320-322 can include watermarks or other indicators, display various messages, or include an indicator of the reason for the redaction. In one case, if a masking object is generated because the client device 160 is communicatively coupled to an unsecured or unknown network, the masking object can include a text indicator that indicates a reason for the redaction (e.g., reference 430 in FIG. 4).

Depending upon the type of content being displayed, the redaction layer generator 138 can generate the redaction layer 310 to include masking objects based on the type of content being displayed. In other words, the redaction layer generator 138 can generate masking objects for lines or paragraphs of electronic documents, pixels or pixel ranges for images, or lengths of audio or video files. For audio and video which includes audio, the redaction layer generator 138 can mask a period of sound. Further, if the content 210 is opened in an application for editing the content 210, then the redaction layer generator 138 can generate a redaction layer for overlay over ranges of the content and lock the underlying redacted content from editing. The redaction layer generator 138 can also insert placeholder or dummy content in place of any content which would be obscured.

As other examples, FIG. 4 illustrates the content 210, the redaction schema 250 associated with the content 210, and the display of three dynamically redacted documents 210A-210C. In FIG. 4, the document 210A is similar to that shown in FIG. 3 for "Joe". However, on the basis of the same underlying content 210, the document 210B is generated for "Sarah". For "Sarah," the redaction layer generator 138 generates a masking layer including the masking objects 420 and 421, without the masking objects 320-322. In this example, the arguments 260-262 in the redaction schema 250 specify the masking objects 320-322 for "Joe" but not "Sarah," and the arguments 263 and 264 specify the masking objects 420 and 421 for "Sarah" but not "Joe."

Finally, for the redacted document 210C, the user is neither "Joe" nor "Sarah." However, according to the argument 265, the redaction layer generator 138 generates the masking object 430 for the user because the user's device has accessed the content 210 while being communicatively coupled to an unsecured or unknown network. As shown in FIG. 4, the masking object 430 includes the text notice "Unsecured Network," to provide an indicator of why the masking object 430 was generated. Similar text notices may be generated by the redaction layer generator 138 for other masking objects. As another example, any of the arguments 260-265 can specify that a masking object be generated when a user's device is located in a certain geographic location or region. In that case, if the client device 160, for example, is moved outside the boundaries of the specified geographic region, the redaction layer generator 138 can generate one or more masking objects with or without a text notice such as "Restricted Geographic Location."

Before turning to the process flow diagrams, it is noted that the client device 160 (e.g., the client application 162) can incorporate the logic, perform the functions, or incorporate the logic and perform the functions described with reference to the redaction service 130 and the content application 140. In other words, while the process flow diagrams are generally described as being performed by the redaction service 130 and the content application 140 in the computing environment 110, the concepts described herein extend to those features being incorporated and performed in standalone devices, such as the client device 160.

Figure 5:
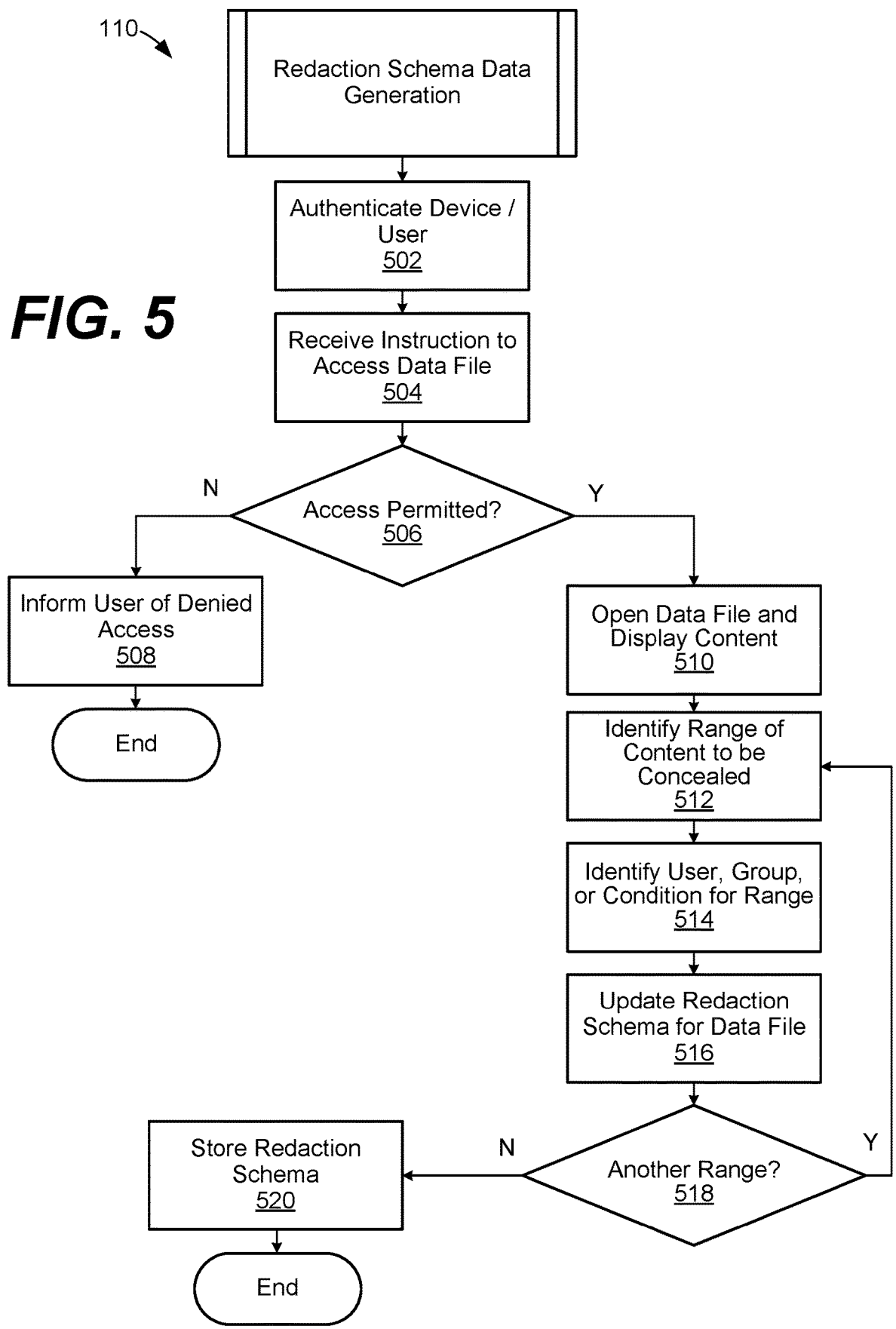
FIG. 5 illustrates a process for the generation of redaction schema data according to various examples described herein.

Turning now to additional examples of the operation of the computing environment 110, FIG. 5 illustrates a process for the generation of redaction schema data according to various examples described herein. Although the process is described below as being performed by the computing device 110 in FIG. 1, the process can be performed by other, similarly configured computing devices or systems.

At step 502, the process includes authenticating a device, a user of a device, or both. For example, as described above, the content access control engine 145 can identify, authorize, or authenticate the client device 160, the user of the client device 160, or both. To that end, the content access control engine 145 can present a challenge to the client device 160, the user of the client device 160, or both, such as a log-in page, password request, secret information exchange, or other challenge. Through the authenticating, the computing environment 110 is able to confidently ascertain both which user and which device is accessing the computing environment 110. This identification can be relied upon by the computing environment 110 to implement selective access to data files stored in the data file repository 128, for example, based on the authentication and identification of users, devices, and other rules or factors.

At step 504, the process includes receiving an instruction to access a data file. For example, the content access control engine 145 can receive a request from the client device 160 to access a data file stored in the data file repository 128. At step 506, the process includes the content access control engine 145 determining whether to permit access to the data file based on whether the client device 160 is authorized, the user of the client device 160 is authorized, other rules or conditions, or combinations thereof. If access is denied in view of insufficient authorization, then the process proceeds to step 508, which includes informing the user of the denied access, and the process ends. Alternatively, if access is permitted, then the process proceeds to step 510.

If access is not denied at step 506, at step 510, the process includes opening the data file and displaying the content in the data file. For example, in FIG. 2, the content 210 of a data file is opened and displayed. The content 210 can be rendered for display on the client device 160 by the display engine 142 of the content application 140, for example, or directly on the client device 160 by the client application 162. As shown, the content 210 includes text and images of an electronic document, as one example of a data file.

At step 512, the process includes identifying at least one range of the content 210 to be concealed or redacted for one or more users, devices, or conditions. For example, in FIG. 2, six ranges of content 260-265 are identified. The ranges of content 260-265 can be identified, together or sequentially, using the client device 160 in any suitable manner, such as by selecting content using input devices, pointers, cursors, keyboards, or other input devices, without limitation. Here, it should be appreciated that the manner in which a range of content is identified can vary depending upon the type of content, input devices available at the client device 160, for example, or other related factors. Depending upon the type of content, a range of content can be identified using a line or paragraph number for an electronic document, using a pixel range for an image, or using a playback time range for an audio file. Further, a range of content can be identified by more than one parameter. For example, a range of content for a video can include both a playback time range as well as a range of pixels in one or more frames. Further, in addition to identifying content by range, content can be identified according to other criteria, such as individual words or phrases, characters, numbers, paragraphs or paragraph numbers, time ranges, pixel ranges, frame ranges, or other criteria.

At step 514, the process includes identifying at least one user, group of users, device operating parameter, other rule or factor, or combination thereof for which a range of content selected at step 512 is to be concealed. For the range of content 220 in FIG. 2, for example, a user of the client device 160 can identify at least one individual or user for which the range of content 220 should be concealed using a user interface of the client application 162. Similarly, the user of the client device 160 can identify at least one individual or user for which the ranges of content 221-225 should be concealed. Among other ways, a user can be identified by name, username, employee identifier, or other identifier, and any group of users can be identified using a suitable identifier for the group, regardless of how the group is organized. Similarly, among other ways, device operating parameters can be identified with reference to a device identifier, a communications network, a geographic location, or some other hardware or software operating condition.

At step 516, the process includes generating and updating the redaction schema for the data file opened at step 510. At step 516, the redaction schema generator 132 can generate or update the redaction schema to include one or more arguments or line items representative of the range, ranges, or other criteria identified at step 512, along with the conditions for which such range or ranges are to be concealed. For example, at step 516, the redaction schema generator 132 can generate or update the redaction schema 250 shown in FIG. 2.

At step 518, the process includes determining whether another range of content is identified. If so, the process proceeds back to step 512. Otherwise, if all ranges of content and associated conditions for redaction have been identified, the process proceeds to step 520. At step 520, the process includes storing the redaction schema. For example, the redaction service 130 can store the redaction schema 250 shown in FIG. 2 in the redaction schema data 126 of the computing environment 110, in association with its corresponding data file.

Figure 6A:
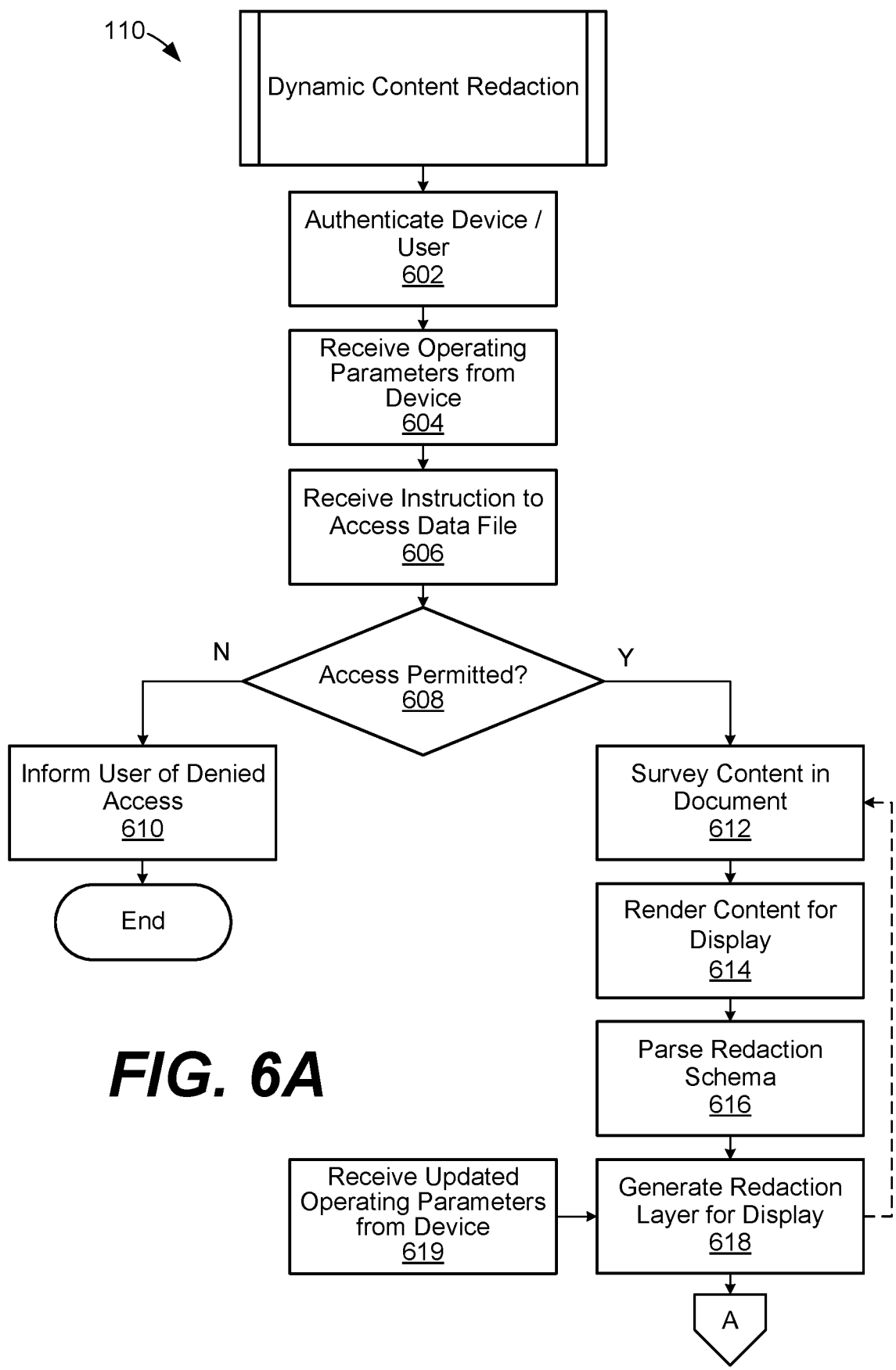
FIG. 6A illustrates a process for dynamic content redaction according to various examples described herein.

Turning to other aspects of dynamic redaction, FIG. 6A illustrates a process for dynamic content redaction according to various examples described herein. Although the process is described below as being performed by the computing device 110 in FIG. 1, the process can be performed by other, similarly configured computing devices or systems. At step 602, the process includes authenticating a device, a user of a device, or both. Again, the content access control engine 145 can identify, authorize, or authenticate the client device 160, the user of the client device 160, or both. To that end, the content access control engine 145 can present a challenge to the client device 160, the user of the client device 160, or both, such as a log-in page, password request, secret information exchange, or other challenge. Through the authenticating, the computing environment 110 is able to confidently ascertain both which user and also which device is accessing the computing environment 110.

At step 604, the process includes receiving, from the device authenticated at step 602, at least one operating status parameter of the device. For example, the operating status parameter can include a device identifier (e.g., Media Access Control (MAC) address), communications network identifier (e.g., internet protocol (IP) address), geographic location, or other hardware-, software-, or computing environment-related operating condition or parameter of the client device 160. As noted above, the content access control engine 145 can compare the operating status parameters against the operating parameter access rules 124 as a security measure to determine if access to the data file repository 128 should be permitted. The operating parameters can be sent by the client device 160 to the computing environment 110 periodically or at one or more predetermined times, for example, or the computing environment 110 can request the operating parameters from the client device 160 periodically or at one or more predetermined times.

At step 606, the process includes receiving an instruction to access a data file. For example, the content access control engine 145 can receive a request from the client device 160 to access a data file stored in the data file repository 128. Thus, at step 608, the process includes the content access control engine 145 determining whether to permit access to the data file based on whether the client device 160 is authorized, the user of the client device 160 is authorized, other rules or conditions, or combinations thereof. If access is denied in view of insufficient authorization, the process proceeds to step 610, which includes informing the user of the denied access, and the process ends. Alternatively, if access is permitted, then the content access control engine 145 accesses the data file stored in the data file repository 128 and the process proceeds to step 612.

If access is permitted, the process includes surveying the content in the accessed data file at step 612. During the surveying, for example, the content application 140 (or the client application 162) can parse the content in the data file and identify the entirety of the ranges of the content. At step 614, the process includes rendering the content for display. In that context, content can be displayed on a display of the client device 160. As an example, FIG. 3 illustrates a display of the content 210. As noted above, the content 210 can be displayed by way of (or assistance by) the content application 140 executing on the computing environment 110, by way of the client application 162 executing on the client device 160, or a combination of both. Alternatively, the content 210 can be displayed after the generation of the redaction layer at step 618, as described below.

At step 616, the process includes parsing a redaction schema associated with the data file for which access was requested at step 606. Here, the redaction schema parser 136 parses the redaction schema associated with the data file surveyed at step 612. For example, as shown in FIG. 3, the redaction schema parser 136 can parse the redaction schema 250. The parsing can include reviewing or analyzing the arguments 260-265 in the redaction schema 250 to determine which ones are applicable based on the user of the device 160 or the operating parameters of the device 160, for example, among other factors.

At step 618, the process includes generating a redaction layer for overlay over the content surveyed at step 612.

Referring to FIG. 3 for an example, the redaction layer generator 138 can generate the redaction layer 310 based on the redaction schema 250. The redaction layer generator 138 can also overlay the redaction layer 310 over the content 210, before, after, or while the content 210 is being displayed. Other examples of generating a redaction layers are described above with reference to FIG. 4.

It is noted that generating the redaction layer at step 618 can be a dynamic, ongoing process for the computing environment 110, the client device 160, or both. For example, as a user of the client device 160 scrolls or proceeds through the content 310, the redaction layer generator 138 can dynamically regenerate or relocate the redaction layer 310 based on the current position of the content 210. This regeneration can include the addition of new masking objects, the movement of masking objects to track scrolling, or other type of dynamic regeneration or relocation.

As another example, the redaction layer generator 138 can also regenerate or update the redaction layer 310 over time based on changes in operating parameters of the client device 160. In that context, at step 619, the process includes receiving at least one updated operating status parameter from the client device 160. The updated operating parameters can be sent by the client device 160 to the computing environment 110 periodically or at one or more predetermined times, for example, or the computing environment 110 can request the operating parameters from the client device 160 periodically or at one or more predetermined times. Thus, if any of the arguments 260-265 in the redaction schema 250 indicate that the content 210 should be masked based on a device operating parameter of the client device 160, the redaction layer generator 138 can compare the operating status parameters received from the client device 160 against the operating parameter access rules 124 to determine whether one or masking objects should be generated. Because the operating parameters of the client device 160 can vary over time (e.g., changes in software, hardware, network connectivity, or user), the redaction layer generator 138 can regenerate or update the redaction layer 310 over time based on the changes. The arguments 260-265 can include other conditions for masking, such as time of day conditions, or other conditions, and the redaction layer generator 138 can regenerate or update the redaction layer 310 over time based on those conditions.

Figure 6B:
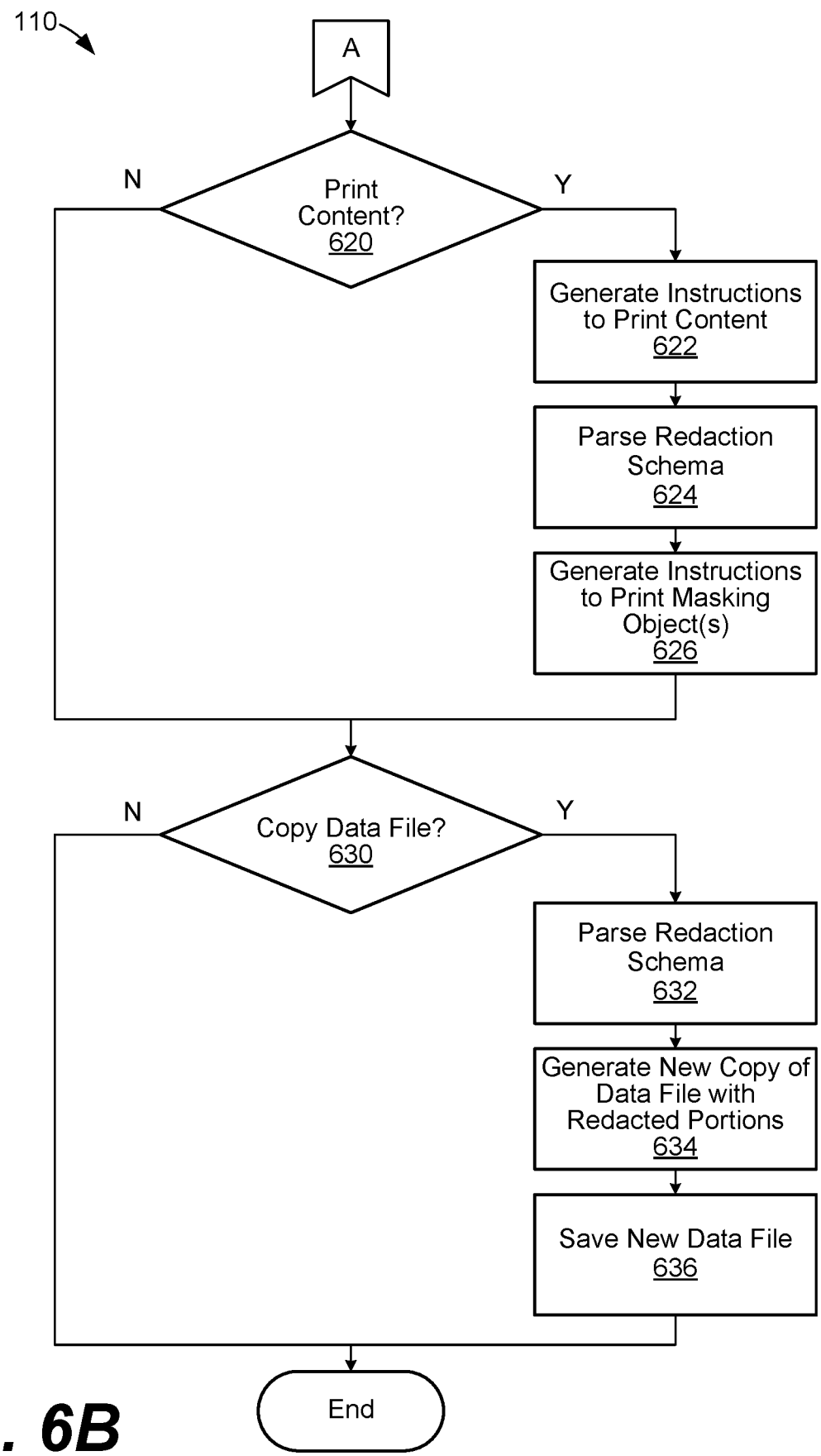
FIG. 6B further illustrates the process for dynamic content redaction in FIG. 6A according to various examples described herein.

After step 618, the process proceeds to step 620 on FIG. 6B. The remaining flow of the process on FIG. 6B is directed to printing, copying, and transferring data files or content in data files. According to aspects described herein, although it is generally not necessary for the redaction service 130 to disturb content in a data file when viewing or editing the content, the redaction service 130 can also generate copies of data files so that certain content is removed when printing, copying, or transferring data files.

As for printing, at step 620, the process includes identifying whether an instruction is received to print content from a data file. If not, then the process proceeds to step 630. Otherwise, the process proceeds to step 622. At step 622, the process includes generating instructions to print content. For example, the print and save engine 144 of the content application 140 can generate instructions to print the content 210 illustrated in FIG. 2 to a printer.

At step 624, the process includes parsing the redaction schema associated with the content being printed. With reference to the example in FIG. 3, the redaction schema parser 136 can parse the redaction schema 250 associated with the content 210, for example. The parsing can include reviewing or analyzing the arguments 260-265 in the redaction schema 250, to determine which ones are applicable based on the user of the client device 160 or the operating parameters of the device 160, for example, among other factors.

At step 626, the process includes generating instructions to print at least one masking object in place of at least part of the instructions to print generated at step 622. As one example, the redaction layer generator 138 can generate instructions to print the masking objects 320-322 shown in FIG. 3, based on an analysis of the redaction schema 250. That is, the redaction layer generator 138 generates instructions to print masking objects based on the user of the client device 160, the operating parameters of the client device 160, or other conditions or factors described herein. Generally, if one or more ranges of content are obscured from view for a given user, the redaction layer generator 138 generates instructions to mask, overwrite, or prevent those ranges from being printed.

As for copying, at step 630, the process includes identifying whether an instruction is received to copy a data file. If not, then the process ends. Otherwise, the process proceeds to step 632. At step 632, the process includes parsing the redaction schema associated with the content being copied. With reference to the example in FIG. 3, the redaction schema parser 136 can parse the redaction schema 250 associated with the content 210, for example. The parsing can include reviewing or analyzing the arguments 260-265 in the redaction schema 250, to determine which ones are applicable based on the user of the client device 160 or the operating parameters of the device 160, for example, among other factors.

At step 634, the process includes generating a new copy of the data file, where the new copy of the data file includes at least one masked or redacted portion of content. As one example, the redaction layer generator 138 can generate a new copy of the data file including the content 210 shown in FIG. 3, but with the content behind the masking objects 320-322 being omitted from the new file. The redaction layer generator 138 can insert placeholder content, such as a redacted message, dummy content, or some other content or indicator message in place of any content which is omitted. In some cases, the redaction layer generator 138 can insert some indicator of where content was removed or redacted. Generally, if one or more ranges of content are to be obscured from view for a given user, the redaction layer generator 138 generates the new file without those ranges of data, without those ranges being visible, or with a substitution of the content over those ranges. At step 636, the process includes saving the new data file. The new data file can be used for e-mailing or sending copies of data files outside the secure access environment, for example. Thus, when the computing environment 110 receives a request for a document from the client device 160, the computing environment 110 can reference the redaction schema 250, generate a masking layer based in part on the redaction schema 250, and apply the masking layer to the document to generate a redacted document for communication to the client device 160.

Apart from the examples described above, in other cases, a data file and redaction schema (in encrypted or unencrypted forms) can be downloaded from the computing environment 110 to the client device 160 and processed locally on the client device 160 in a manner consistent with the concepts described herein. Also, if a request is received to open a data file using an application that is not capable dynamic redaction, the computing environment 110 can restrict the application from opening the data file. Alternatively, the computing environment 110 can generate a new copy of the data file for the application. In the new copy, the redaction layer generator 138 can insert some indicator of where content was removed or redacted or insert placeholder or dummy content. Further, if one or more ranges of content are to be redacted, the redaction layer generator 138 can generate the new file without those ranges of data, without those ranges being visible, or with a substitution of the content over those ranges. Additionally, the redaction layer generator 138 can generate the new file including a redaction layer and lock the underlying redacted content from editing.

The flowcharts of FIGS. 5, 6A, and 6B show examples of the functionality and operation of implementations of components described herein. The components described herein can be implemented in hardware, software, or a combination of hardware and software. If implemented at least in part in software, each element can represent a module of code or a portion of code that includes program instructions to implement the specified logical function(s). The program instructions can be in the form of source code, for example, that includes human-readable statements written in a programming language or machine code that includes machine instructions recognizable by a suitable execution system, such as a processor in a computer system or other system. If implemented at least in part in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 160, computing environment 110, and other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the redaction service 130, the content application 140, the content access control engine 145, and/or other components can be stored in one or more storage devices and be executable by one or more processors. Also, a data store, such as the data store 120 can be stored in the one or more storage devices.

The redaction service 130, the content application 140, the content access control engine 145, and other components described herein can be implemented at least in part in the form of hardware, as software components that are executable by hardware, or as a combination of software and hardware. If implemented at least in part as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the redaction service 130, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 110. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code for dynamic content redaction executable in at least one computing device, the program code being configured to cause the at least one computing device to at least:
    parse a redaction schema for a data file, the data file comprising content for display on a device, the redaction schema being separate from the data file and comprising a first argument identifying at least one range of the content in the data file and a group of users for the at least one range of the content, and a second argument identifying at least one other range of the content in the data file and at least one device parameter for the at least one other range of the content;
    generate a redaction layer for overlay over the content for display on the device based on the redaction schema; and
    render the content for display on the device under the redaction layer, wherein:
        the redaction layer comprises a first masking object for the at least one range of the content based on an evaluation of a user of the device against the group of users identified in the redaction schema and a second masking object for the at least one other range of the content based on an evaluation of an operating status parameter of the device against the at least one device parameter identified in the redaction schema; and
        the redaction layer comprises a text indicator that indicates a reason for at least one of the first masking object or the second masking object.

2. The non-transitory computer-readable medium according to claim 1, wherein the program code is further configured to cause the at least one computing device to at least:
    identify a changed operating status parameter of the device; and
    regenerate the redaction layer and the text indicator of the redaction layer based on the changed operating status parameter of the device.

3. The non-transitory computer-readable medium according to claim 2, wherein the changed operating status parameter comprises at least one of: a changed communications network, a changed geographic location, or a changed compliance rule parameter associated with the device.

4. The non-transitory computer-readable medium according to claim 1, wherein the text indicator indicates at least one of: a communications network, a geographic location, or a compliance rule reason for the masking object.

5. The non-transitory computer-readable medium according to claim 1, wherein the at least one range of the content comprises content to be concealed for at least one individual user and at least one group of users.

6. The non-transitory computer-readable medium according to claim 1, wherein the at least one range of the content is defined with reference to at least one of: a line or paragraph number, a pixel range of an image, or a playback time range of media.

7. The non-transitory computer-readable medium according to claim 1, wherein the at least one other range of the content to be concealed comprises:
    at least one first range of the content to be concealed based on a first operating status parameter of the device; and
    at least one second range of the content to be concealed based on a second operating status parameter of the device.

8. The non-transitory computer-readable medium according to claim 1, wherein the program code is further configured to cause the at least one computing device to at least:
    generate instructions to print the content; and
    generate instructions to print the masking object in place of at least a portion of the instructions to print the content based in part on the redaction schema.

9. A method for dynamic content redaction, comprising:
    parsing, with at least one computing device, a redaction schema for a data file, the data file comprising content for display on a device, the redaction schema comprising a first argument identifying at least one range of the content in the data file and a group of users for the at least one range of the content, and a second argument identifying at least one other range of the content in the data file and at least one device parameter for the at least one other range of the content; and
    generating, with the at least one computing device, a redaction layer for overlay over the content for display on the device based on the redaction schema, wherein:
        the redaction layer comprises a first masking object for the at least one range of the content based on an evaluation of a user of the device against the group of users identified in the redaction schema and a second masking object for the at least one other range of the content based on an evaluation of an operating status parameter of the device against the at least one device parameter identified in the redaction schema.

10. The method according to claim 9, further comprising:
identifying, with the at least one computing device, a changed operating status parameter of the device; and
regenerating, with the at least one computing device, the redaction layer based on the changed operating status parameter of the device.

11. The method according to claim 10, wherein the changed operating status parameter comprises at least one of: a changed communications network, a changed geographic location, or a changed compliance rule parameter associated with the device.

12. The method according to claim 9, wherein:
the masking object comprises a text indicator that indicates a reason for the masking object; and
the text indicator indicates at least one of: a communications network, a geographic location, or a compliance rule reason for the masking object.

13. The method according to claim 9, wherein the at least one range of the content comprises content to be concealed for at least one individual user and at least one group of users.

14. The method according to claim 9, wherein the at least one range of the content is defined with reference to at least one line or of: a paragraph number, a pixel range of an image, or a playback time range of media.

15. The method according to claim 9, wherein the at least one other range of the content to be concealed comprises:
at least one first range of the content to be concealed based on a first operating status parameter of the device; and
at least one second range of the content to be concealed based on a second operating status parameter of the device.

16. The method according to claim 9, further comprising:
generating, with the at least one computing device, instructions to print the content; and
generating, with the at least one computing device, instructions to print the masking object in place of at least a portion of the instructions to print the content based in part on the redaction schema.

17. A system for dynamic content redaction, comprising:
at least one memory device to store computer-readable instructions thereon; and
at least one computing device configured, through execution of the computer-readable instructions, to at least:
parse a redaction schema for a data file, the data file comprising content for display on a device, the redaction schema comprising a first argument identifying at least one range of the content in the data file and a group of users for the at least one range of the content, and a second argument identifying at least one other range of the content in the data file and at least one device parameter for the at least one other range of the content;
generate a redaction layer for overlay over the content for display on the device based on the redaction schema; and
render the content for display on the device under the redaction layer, wherein:
the redaction layer comprises a first masking object for the at least one range of the content based on an evaluation of a user of the device against the group of users identified in the redaction schema and a second masking object for the at least one other range of the content based on an evaluation of an operating status parameter of the device against the at least one device parameter identified in the redaction schema.

18. The system of claim 17, wherein the at least one computing device is further configured to:
identify a changed operating status parameter of the device; and
regenerate the redaction layer based on the changed operating status parameter of the device, wherein:
the changed operating status parameter comprises at least one changed communications network, changed geographic location, or changed compliance rule associated with the device.

19. The system of claim 17, wherein:
the masking object comprises a text indicator that indicates a reason for the masking object; and
the text indicator indicates at least one of: a communications network, a geographic location, or a compliance rule reason for the masking object.

20. The system of claim 17, wherein the at least one other range of the content to be concealed comprises:
at least one first range of the content to be concealed based on a first operating status parameter of the device; and
at least one second range of the content to be concealed based on a second operating status parameter of the device.

* * * * *